United States Patent
Leu et al.

(10) Patent No.: US 7,085,460 B2
(45) Date of Patent: Aug. 1, 2006

(54) LIGHT GUIDE PLATE WITH DIFFUSION DOTS HAVING SCATTERING PARTICLES AND SURFACE LIGHT SOURCE UNIT INCORPORATING THE LIGHT GUIDE PLATE

(75) Inventors: Charles Leu, Fremont, CA (US);
Ga-lane Chen, Fremont, CA (US);
Michael Lin, Tu-Chen (TW);
Ming-Hsuan Liu, Tu-Chen (TW);
Tai-Cheng Yu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 190 days.

(21) Appl. No.: 10/745,218

(22) Filed: Dec. 22, 2003

(65) Prior Publication Data

US 2004/0136667 A1    Jul. 15, 2004

(30) Foreign Application Priority Data

Dec. 20, 2002    (TW) .............................. 91220819 U

(51) Int. Cl.
*G02B 6/04*    (2006.01)

(52) U.S. Cl. ...................... 385/120; 385/901; 385/146
(58) Field of Classification Search ................ 385/120, 385/901, 146
See application file for complete search history.

(56) References Cited

U.S. PATENT DOCUMENTS

| 5,178,447 | A |   | 1/1993  | Murase et al. |
|-----------|---|---|---------|----------------------------|
| 5,506,924 | A | * | 4/1996  | Inoue .................... 385/129 |
| 5,718,497 | A | * | 2/1998  | Yokoyama et al. ........ 362/625 |
| 5,764,322 | A | * | 6/1998  | Mamiya et al. ............ 349/65 |
| 5,818,555 | A | * | 10/1998 | Yokoyama et al. ......... 349/67 |
| 6,011,601 | A | * | 1/2000  | Kojima .................... 349/62 |
| 6,147,725 | A | * | 11/2000 | Yuuki et al. ............... 349/65 |
| 6,219,117 | B1|   | 4/2001  | Nagakubo et al. |
| 6,339,458 | B1| * | 1/2002  | Ohkawa .................... 349/65 |
| 6,425,673 | B1| * | 7/2002  | Suga et al. ................ 362/613 |
| 6,485,157 | B1| * | 11/2002 | Ohkawa .................... 362/625 |
| 6,530,671 | B1| * | 3/2003  | Taniguchi et al. ......... 362/619 |
| 6,614,170 | B1| * | 9/2003  | Wang et al. ............... 313/498 |
| 6,744,960 | B1| * | 6/2004  | Pelka ....................... 385/130 |
| 6,827,458 | B1| * | 12/2004 | Suga ........................ 362/609 |
| 6,906,761 | B1| * | 6/2005  | Nakano ..................... 349/65 |
| 2002/0005924 | A1| * | 1/2002 | Kimura ..................... 349/112 |
| 2002/0015297 | A1| * | 2/2002 | Hayashi et al. ............ 362/27 |
| 2003/0031453 | A1| * | 2/2003 | Tsubokura et al. ......... 385/147 |
| 2004/0141700 | A1| * | 7/2004 | Yang ........................ 385/120 |
| 2004/0262583 | A1| * | 12/2004 | Lee ......................... 252/500 |
| 2005/0196122 | A1| * | 9/2005 | Tseng ....................... 385/146 |

FOREIGN PATENT DOCUMENTS

JP              06094920      *   4/1994

* cited by examiner

*Primary Examiner*—Ellen E. Kim
(74) *Attorney, Agent, or Firm*—Wei Te Chung

(57) ABSTRACT

A surface light source unit (2) includes a light source (21), a light guide plate (22), a reflective plate (23) and a diffusing plate (24). The light guide plate includes a light incidence surface (221) adjacent to the light source for receiving light beams, an emission surface (222) for emitting the light beams, a light reflection surface (223) opposite to the emission surface and a plurality of diffusion dots (224) formed on the light reflection surface. The diffusion dots contain a plurality of light scattering particles (225) having substantially global surfaces. The surface light source unit provides high uniform illumination for a liquid crystal display panel.

20 Claims, 3 Drawing Sheets

LIGHT GUIDE PLATE WITH DIFFUSION DOTS HAVING SCATTERING PARTICLES AND SURFACE LIGHT SOURCE UNIT INCORPORATING THE LIGHT GUIDE PLATE

BACKGROUND OF THE INVENTION

1. Field of the Invention

The present invention relates to a light guide plate and a surface light source unit using the same, and especially to a light guide plate providing highly uniform illumination.

2. Description of Prior Art

Recently, liquid crystal display devices have undergone remarkable improvements, and their market has been steadily growing. These devices save installation space by virtue of their slimness, and they can also save power.

Liquid crystal displays commonly use a surface light source to provide illumination. The surface light source includes a light guide plate having a uniform thickness or being wedge-shaped. The light guide plate distributes light from a substantially linear source such as a cold cathode fluorescent lamp (CCFL), in order to provide substantially even illumination to the LCD.

In particular, the light guide plate is provided for distribution of light from the light source over an area much larger than an area of the light source; that is, over an entire output surface area of the light guide plate. In operation, light beams typically enter the light guide plate at an edge surface thereof. Some of the light beams propagate between a bottom surface and the output surface toward an opposite end surface of the light guide plate by total internal reflection, and other light beams are output through the output surface directly. Further, the bottom surface includes structures such as dots formed thereon or facets cut therein and arranged in a pattern. Light beams that impinge on these structures are diffusely reflected and then emitted through the output surface.

FIG. 4 shows a conventional light guide plate 12, which comprises a light incidence surface 121, an emission surface 122, a bottom surface 123 opposite to the emission surface 122, and a plurality of diffusion dots 124 formed on the bottom surface 123.

FIG. 5 is an enlarged view of part of the light guide plate 12 of FIG. 4. The diffusion dots 124 are formed by a screen printing technique, which employs pale or white ink containing a white pigment 125 such as titanium dioxide ($TiO_2$) or barium sulfate ($BaSO_4$). However, the reflectivity of the white pigment 125 is limited. Furthermore, when light is reflected by the white pigment 125, a part of the light is also absorbed by the white pigment 125. This loss of light beams means that the light guide plate 12 cannot provide high uniform illumination and high brightness for a liquid crystal display panel.

Accordingly, it is desired to provide a light guide plate that solves the above-mentioned problems.

SUMMARY OF THE INVENTION

An object of the present invention is to provide a surface light source unit which provides uniform illumination for a liquid crystal display panel.

To achieve the above object, the surface light source unit of the present invention includes a light source and a light guide plate. The light source is adjacent to the light guide plate for emitting light beams. The light guide plate includes a light incidence surface for receiving the light beams from the light source, an emission surface for emitting the light beams, a light reflection surface opposite to the emission surface and a plurality of diffusion dots in which contains a plurality of light scattering particles formed on the light reflection surface for scattering the light beams. The light scattering particles are made of material having high reflectivity, such as polymethyl methacrylate (PMMA), silicon dioxide ($SiO_2$), or the like. The light scattering particles have substantially global surfaces for reflecting the light beams. The light scattering particles are dispersed into the diffusion dots during the formation of the diffusion dots. The light scattering particles improve the scattering capability of the diffusion dots, so that the surface light source unit can provide a high uniform illumination for a liquid crystal display panel.

Other objects, advantages, and novel features of the present invention will become more apparent from the following detailed description when taken in conjunction with the accompanying drawings, in which:

DETAILED DESCRIPTION OF THE INVENTION

Figure 1:
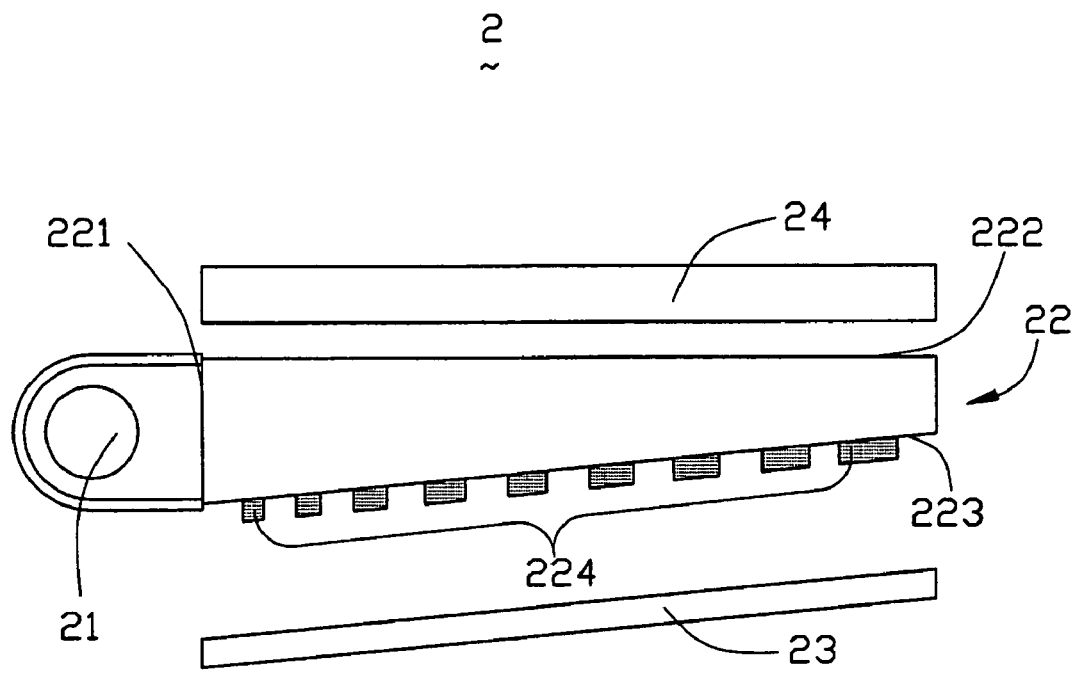
FIG. 1 is an exploded, side elevation of a surface light source unit according to the present invention.

FIG. 1 shows an exploded, side elevation of a surface light source unit 2 in accordance with a preferred embodiment of the present invention. The surface light source unit 2 comprises a light source 21, a light guide plate 22, a diffusing plate 24, and a reflective plate 23.

The light guide plate 22 is wedge-shaped, and includes a light incidence surface 221, an emission surface 222 and a light reflection surface 223 opposite to the emission surface 222. The light reflection surface 223 has a plurality of diffusion dots 224 formed thereon. A material of the light guide plate 22 is one that provides efficient transmission capability. The material may be an acrylic resin, such as polymethyl methacrylate (PMMA). In an alternative embodiment, a cross section of the light guide plate 22 can be rectangular.

The light source 21 is a linear light source, such as a cold cathode fluorescent lamp (CCFL). The light source 21 is disposed adjacent to the light incidence surface 221 of the light guide plate 22. The diffusing plate 24 is disposed on the emission surface 222 of the light guide plate 22. The reflective plate 23 is disposed under the light reflection surface 223 of the light guide plate 22.

The diffusion dots 224 are preferably parallelepiped-shaped. Other alternative shapes can also be selected, such as cylindrical, pyramidal and ellipsoidal-profiled. To promote uniformity of light beams passing out through the emission surface 222, sizes of the diffusion dots 224 progressively increase with increasing distance away from the light source 21. Alternatively, the diffusion dots 224 may be configured to be both uniform in size and progressively greater in number, which likewise achieves said uniformity of light beams. The diffusion dots 224 can be made by a screen printing technique, which uses a pale or white ink containing a white pigment such as titanium oxide. The diffusion dots 224 can also be made by a mechanical shot blasting technique, a photo-sensing method using sensitized paper, an integral molding technique, or any other appropriate known method.

Figure 2:
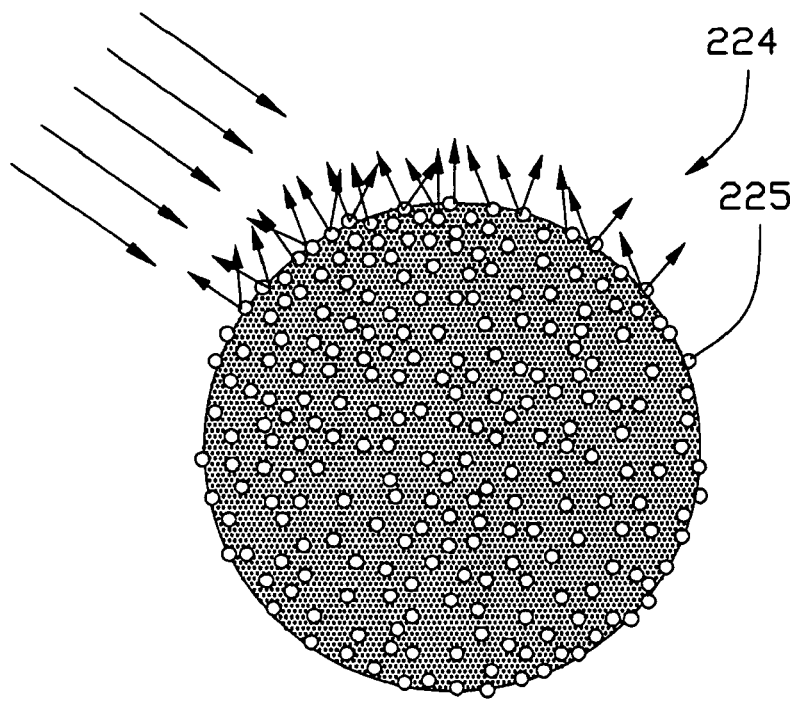
FIG. 2 is an enlarged, schematic view of part of any one diffusion dot of the surface light source unit of FIG. 1, showing exemplary optical paths.

Referring to FIG. 2, the diffusion dots 224 contain a plurality of light scattering particles 225 which are made of a material having high reflectivity. Such material is preferably polymethyl methacrylate (PMMA), and may also be silicon dioxide ($SiO_2$) or the like. Further, inorganic fine particles may be dispersed as light scattering material in the diffusion dots 224. Such particles may be glass beads, or fine particles made of styrene resin, acrylic resin, silicone resin or the like. The light scattering particles 225 are preferably uniformly sized mono-dispersed micro spheres, whose diameters are preferably in the range from 1 micrometer to 10 micrometers. That is, the light scattering particles 225 have substantially globular surfaces for reflecting light beams. Alternatively, the light scattering particles 225 may be differently sized. The light scattering particles 225 are dispersed into the diffusion dots 224 during the formation of the diffusion dots 224. When light beams enter the diffusion dots 224, they are reflected in all directions by the surfaces of the light scattering particles 225. By using the light scattering particles 225, the reflectivity of the diffusion dots 224 is enhanced. This enables the light beams emitting from the emission surface 222 to be more uniform.

Figure 3:
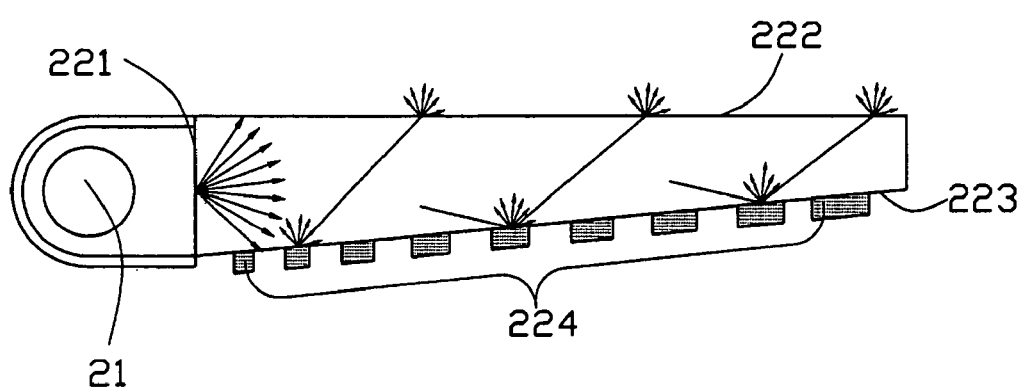
FIG. 3 is an assembled view of the surface light source unit of FIG. 1, showing exemplary optical paths.
Figure 4:
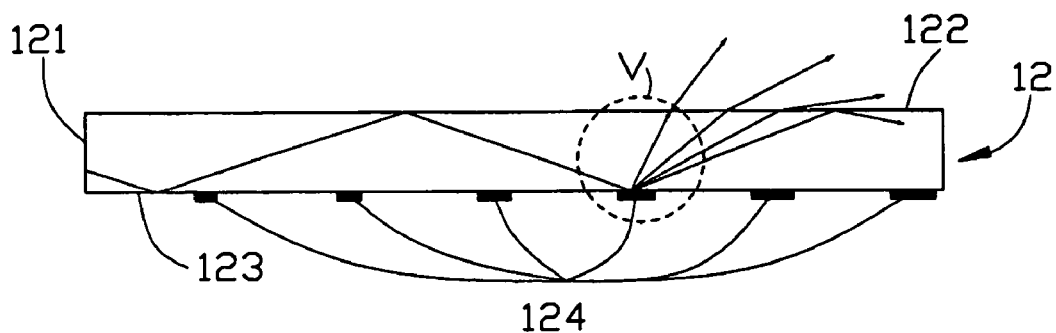
FIG. 4 is a side elevation of a conventional light guide plate.
Figure 5:
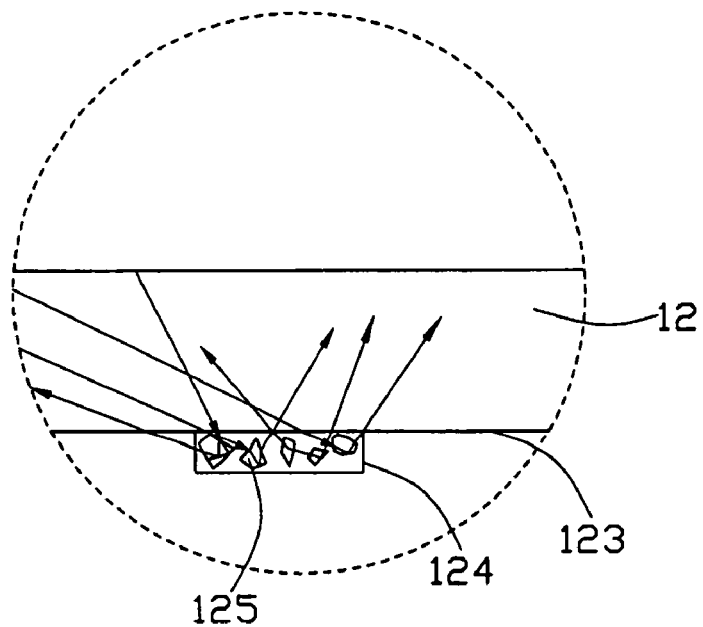
FIG. 5 is an enlarged view of a circled portion V of FIG. 4.

Referring to FIG. 3, in operation, the light source 21 emits light beams into the light guide plate 22. One portion of the incident light beams is reflected and scattered by the diffusion dots 224 and emitted out through the emission surface 222. A remaining portion of the light beams is emitted from the light reflection surface 223 to an outside of the light guide plate 22, where said light beams are reflected by the reflective plate 23 back into the light guide plate 22. The diffusion dots 224 scatter these light beams.

In summary, the surface light source unit 2 according to the present invention has the following main advantage. The provision of the light scattering particles 225 in the diffusion dots 224 makes it possible to effectively reflect and scatter the input light beams so that uniformity of illumination of the light guide plate 22 is enhanced. That is, the surface light source unit 2 of the present invention provides highly uniform illumination.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A light guide plate comprising:
    a light incidence surface for receiving light beams;
    an emission surface for emitting the light beams;
    a light reflection surface opposite to the emission surface; and
    a plurality of diffusion dots formed on the light reflection surface, the diffusion dots each containing a plurality of light scattering particles having substantially globular surfaces for scattering the light beams.

2. The light guide plate as claimed in claim 1, wherein the light scattering particles are made of polymethyl methacrylate (PMMA).

3. The light guide plate as claimed in claim 1, wherein the light scattering particles are made of silicon dioxide ($SiO_2$).

4. The light guide plate as claimed in claim 1, wherein the light scattering particles are uniformly sized.

5. The light guide plate as claimed in claim 1. wherein diameters of the light scattering particles are in the range from 1 micrometer to 10 micrometers.

6. The light guide plate as claimed in claim 1, wherein the diffusion dots are substantially parallelepiped-shaped.

7. The light guide plate as claimed in claim 1, wherein the diffusion dots have a same size.

8. The light guide plate as claimed in claim 1, wherein sizes of the diffusion dots vary according to their distances from the light incidence surface.

9. A surface light source unit comprising:
    a light source for emitting light beams; and
    a light guide plate, which comprises:
        a light incidence surface adjacent to the light source for receiving the light beams;
        an emission surface for emitting the light beams;
        a light reflection surface opposite to the emission surface; and
        a plurality of diffusion dots formed on the light reflection surface, at least one of the plurality of diffusion dots containing a plurality of light scattering particles having substantially globular surfaces for scattering the light beams.

10. The surface light source unit as claimed in claim 9, wherein the light scattering particles are made of polyznethyl methacrylate (PMMA).

11. The surface light source unit as claimed in claim 9, wherein the light scattering particles are made of silicon dioxide ($SiO_2$).

12. The surface light source unit as claimed in claim 9. wherein the light scattering particles are unifonnly sized.

13. The surface light source unit as claimed in claim 9, wherein diameters of the light scattering particles are in the range from 1 micrometer to 10 micrometers.

14. The surface light source unit as claimed in claim 9, wherein the diffusion dots are substantially parallelepiped-shaped.

15. The surface light source unit as claimed in claim 9, wherein the diffusion dots have a same size.

16. The surface light source unit as claimed in claim 9, wherein sizes of the diffusion dots vary according to their distances from the light incidence surface.

17. The surface light source unit as claimed in claim 9, wherein the light source is a cold cathode fluorescent lamp (CCFL).

18. The surface light source unit as claimed in claim 9, further comprising a diffusing plate disposed on the emission surface of the light guide plate for diffusing the light beams.

19. The surface light source unit as claimed in claim 9, further comprising a reflective plate provided under the light guide plate for reflecting light beams.

20. A method of making a light guide plate, comprising steps of:
    forming a light incident surface;
    forming an emission surface and a refection surface opposite to said emission surface; and
    providing said reflection surface with a plurality of diffusion dots; wherein
    each of said diffusion dots is equipped with a plurality of light scattering particles each made of high reflection material thereof and defining a spherical surface thereon.

* * * * *